United States Patent
Glas et al.

(10) Patent No.: US 7,516,042 B2
(45) Date of Patent: Apr. 7, 2009

(54) LOAD TEST LOAD MODELING BASED ON RATES OF USER OPERATIONS

(75) Inventors: Ed Glas, Raleigh, NC (US); Bill Barnett, Chapel Hill, NC (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/652,465

(22) Filed: Jan. 11, 2007

(65) Prior Publication Data
US 2008/0172581 A1    Jul. 17, 2008

(51) Int. Cl.
*G06F 15/00* (2006.01)

(52) U.S. Cl. .......................... 702/182; 702/57; 702/81; 702/84; 702/108; 702/117; 702/118; 702/176; 702/186; 455/405; 455/423; 709/223; 709/224; 709/225; 714/24; 714/25; 714/26; 714/27

(58) Field of Classification Search ................. 702/186, 702/187, 57, 81, 84, 108, 117–118, 176, 702/182; 455/405, 423; 709/223–225; 714/24–27
See application file for complete search history.

(56) References Cited

U.S. PATENT DOCUMENTS

| | | | |
|---|---|---|---|
| 5,790,117 A | 8/1998 | Halviatti et al. | |
| 6,408,403 B1 | 6/2002 | Rodrigues et al. | |
| 6,421,822 B1 | 7/2002 | Pavela | |
| 6,587,969 B1 | 7/2003 | Weinberg et al. | |
| 6,775,644 B2 * | 8/2004 | Myers | 702/186 |
| 6,799,213 B1 | 9/2004 | Zhao et al. | |
| 7,047,446 B1 | 5/2006 | Maurer et al. | |
| 7,082,381 B1 * | 7/2006 | Saghier et al. | 702/182 |
| 2003/0074606 A1 | 4/2003 | Boker | |
| 2003/0182408 A1 | 9/2003 | Hu | |
| 2005/0135267 A1 | 6/2005 | Galbraith et al. | |
| 2005/0216234 A1 | 9/2005 | Glas et al. | |

OTHER PUBLICATIONS

"Siebel 7.7 Integration with Mercury LoadRunner 8.0", Date: 2002, http://www.siebel.com/partners/portal/docs/datasheets/DataSheet_LR80.pdf.

Haas, et al., "DiscoveryLink: A system for integrated access to life sciences data sources", Date: 2001, vol. 40, No. 2, http://researchweb.watson,ibm.com/journal/sj/402/haas.pdf.

Steinert, et al., "Generation of Realistic Signalling Traffic in an ISDN Load Test System Using SDL User Models", http://www.ikr.uni-stuttgart.de/Content/Publications/Archive/ts_PSTV00_32649.ps.

* cited by examiner

*Primary Examiner*—Tung S Lau
*Assistant Examiner*—Sujoy K Kundu (57) ABSTRACT

Various technologies and techniques are disclosed for performing load tests based upon user pace. A load test application is provided. Load test settings are received from a user that includes a test mix based upon user pace. A test start interval is calculated using the text mix. A load test is performed based upon the text mix. For example, the tests are executed at a pace that is based upon the test start interval for the particular user profile that the test is contained within.

13 Claims, 12 Drawing Sheets

NEW LOAD TEST WIZARD     400

SELECT A TEST MIX MODEL FOR THE LOAD TEST

MODEL THE EXPECTED REAL-WORLD USAGE OF THE APPLICATION OR WEB SITE TO BE LOAD TESTED BY SELECTING ONE OF THE TEST MIX OPTIONS

○ TEST MIX PERCENTAGE BASED ON NUMBER OF TESTS STARTED
THE NEXT TEST TO START IS BASED ON THE NUMBER OF TIMES EACH TEST HAS ALREADY BEEN STARTED. USE THIS MODEL WHEN YOU DO NOT WANT TO TAKE INTO CONSIDERATION THE NUMBER OF USERS CURRENTLY RUNNING EACH TEST

○ TEST MIX PERCENTAGE BASED ON NUMBER OF TESTS RUNNING
THE NEXT TEST TO START IS BASED ON THE NUMBER OF USERS CURRENTLY RUNNING EACH TEST. USE THIS MODEL WHEN SOME OF THE TESTS IN THE TEST MIX ARE SIGNIFICANTLY LONGER AND YOU WISH TO PREVENT LARGE DIFFERENCES IN THE PERCENTAGE OF USERS RUNNING EACH TEST AT A PARTICULAR POINT IN TIME FROM THE SPECIFIED PERCENTAGES

⦿ TEST MIX BASED ON USER PACE
THE RATE OF TEST EXECUTION FOR EACH VIRTUAL USER IS SPECIFIED FOR EACH TEST MIX. FOR EXAMPLE: 4 TESTS PER USER/HR. USE THIS MODEL TO GUARANTEE THAT THE ACTUAL RATE AT WHICH TESTS ARE STARTED IS LESS THAN OR EQUAL TO THE SPECIFIED RATE

[ < PREVIOUS ]  [ NEXT > ]  [ FINISH ]  [ CANCEL ]

WELCOME
SCENARIO
  LOAD PATTERN
  TEST MIX MODEL
  TEST MIX
  BROWSER MIX
  NETWORK MIX
COUNTER SETS
RUN SETTINGS

NEW LOAD TEST WIZARD — □ ×

ADD TESTS TO A LOAD TEST SCENARIO AND EDIT THE TEST MIX BY USER PACE — 410

ADD ONE OR MORE TESTS TO THE PACING TEST MIX AND SPECIFY THE NUMBER OF TESTS PER HOUR (E.G. 0.125 TESTS PER USER PER HOUR)

- WELCOME
- SCENARIO
- LOAD PATTERN
- TEST MIX MODEL
- TEST MIX
- BROWSER MIX
- NETWORK MIX
- COUNTER SETS
- RUN SETTINGS

| | TEST NAME (412) | TESTS PER USER PER HOUR (414) |
|---|---|---|
| 1 | LOOKUP CUSTOMER | 4 |
| 2 | CREATE INVOICE | 1 |
| 3 | PAY INVOICE | .125 |
| | TOTAL | 5.125 |

[ ADD... ]
[ REMOVE ]

[ < PREVIOUS ]  [ NEXT > ]  [ FINISH ]  [ CANCEL ]

FIG. 9

EDIT TEST MIX

TEST MIX MODEL: TEST MIX BASED ON USER PACE ▼  — 422

— 420

[ADD]
[REMOVE]

| | TEST NAME | TESTS PER USER PER HOUR |
|---|---|---|
| 1 | LOOKUP CUSTOMER | 4 |
| 2 | CREATE INVOICE | 1 |
| 3 | PAY INVOICE | 1 |
| | | |
| | | |
| | | |
| | TOTAL | 6 |

— 424    — 426

INITIALIZE AND TERMINATE TESTS

☑ SELECT AN INITIALIZE TEST TO EXECUTE BEFORE OTHER TESTS FOR EACH VIRTUAL USER:
LOGON [...]

☑ SELECT A TERMINATE TEST TO EXECUTE AFTER OTHER TESTS FOR EACH VIRTUAL USER:
LOGOFF [...]

[OK] [CANCEL]

| TEST NAME | TESTS PER USER PER HOUR |
|---|---|
| TEST1 | 3 |
| TEST2 | 2 |
| TEST3 | 0.5 |
| TEST4 | 0.5 |

440 ← 442

| TOTAL TESTS PER HOUR | 6.0 |
|---|---|
| TEST START INTERVAL | 10 MINUTES |

LOAD TEST LOAD MODELING BASED ON RATES OF USER OPERATIONS

BACKGROUND

Various load testing products exist to model how a particular application or web site performs in a real-world scenario. These load testing products have various types of tests that can be performed to assess system performance, such as tests that determine at what point the system slows down dramatically. The problem with the tests performed by existing load testing products is that they do not take into account that the same user may take different actions over a certain period of time. Take a web site, for example, that sells products to consumers. That web site can be visited by multiple consumers at the same time. One of the consumers may read product details about various items he is potentially interested in purchasing. Another consumer may locate a particular product and add it to a shopping cart for purchase and then initiating the checkout process. Yet another consumer may need to return a product previously purchased, and thus may obtain a return merchandise authorization (RMA) number from the web site.

SUMMARY

Various technologies and techniques are disclosed for performing load tests based upon user pace. A load test application is provided. Load test settings are received from a user that includes a test mix based upon user pace. In one implementation, the test mix includes a test name/identifier and a test frequency for each test in the user profile. A test start interval is calculated using the text mix. A load test is performed based upon the text mix. For example, the tests are executed at a pace that is based upon the test start interval for the particular user profile that the test is contained within.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that performs load tests, but the system also serves other purposes in addition to these. In one implementation, one or more of the techniques described herein can be implemented as features within a load testing program contained within a development environment such as MICROSOFT® VISUAL STUDIO®, or from any other type of program or service that performs load tests. In another implementation, one or more of the techniques described herein are implemented as features with other applications that deal with modeling performance of a particular application. In yet another implementation, one or more of the techniques described herein are implemented as features within performance modeling tools that use synthetic transactions to monitor the performance of web sites.

In one implementation, a load test tool is provided that takes user behaviors into account by allowing the user (e.g. tester) to create a load test by mixing various test scenarios of different user groups and assigning each user group an execution pace. For example, a test name and test frequency can be specified for each test in a given user profile. For a billing clerk user profile, the test may include Customer Lookup, Create Invoice, and Pay Invoice, as a few examples. Each of these tests can be assigned a test frequency to specify how frequently the typical billing clerk performs these tasks in a given time frame, such as per hour. This test mix is then used to calculate a test start interval that is used to set the pace at which the various tests for that user profile are performed. The same process is applied to each of the user profiles so the tests from the different user profiles can be performed simultaneously.

Figure 1:
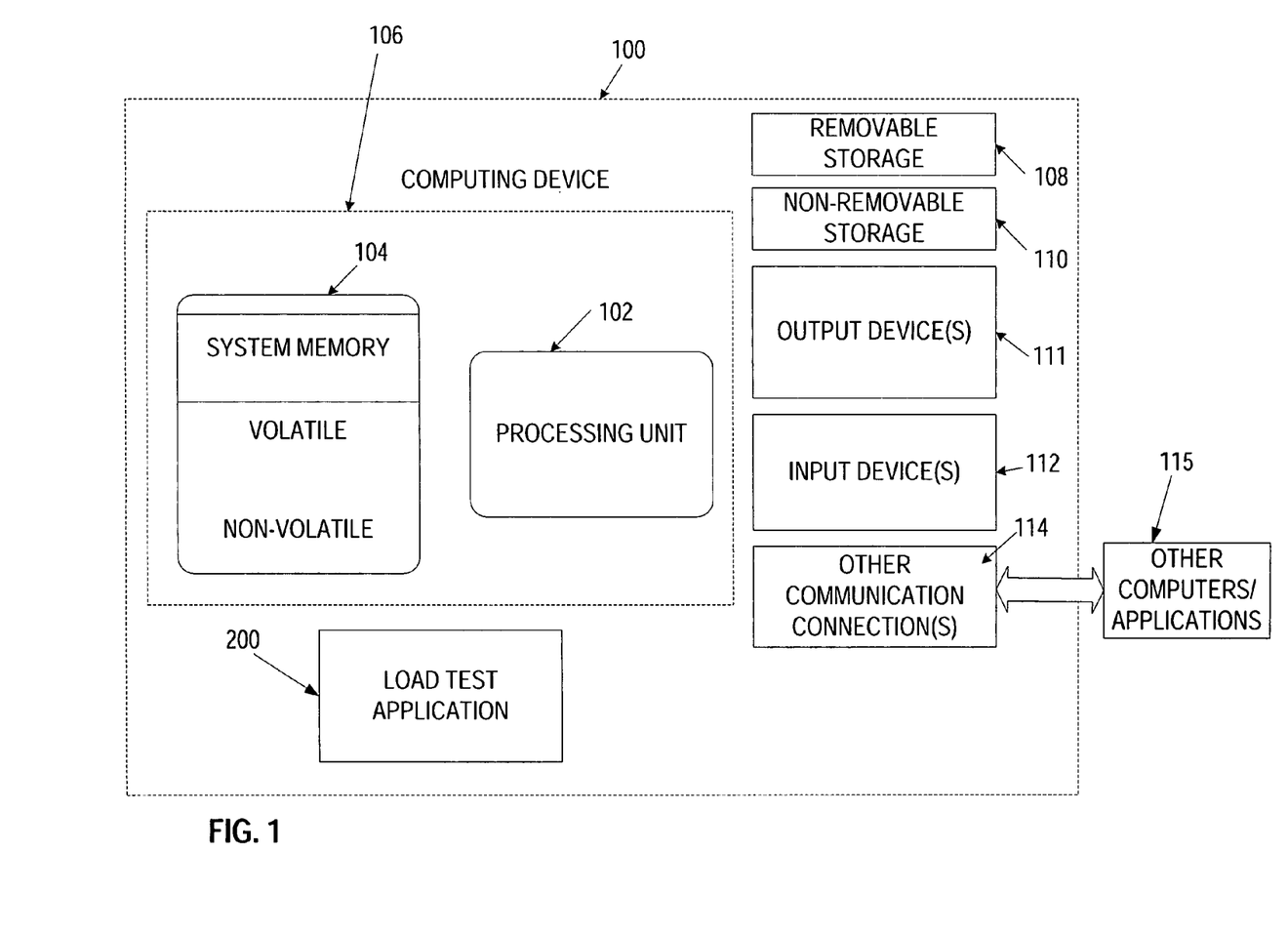
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes load test application 200. load test application 200 will be described in further detail in FIG. 2.

Figure 2:
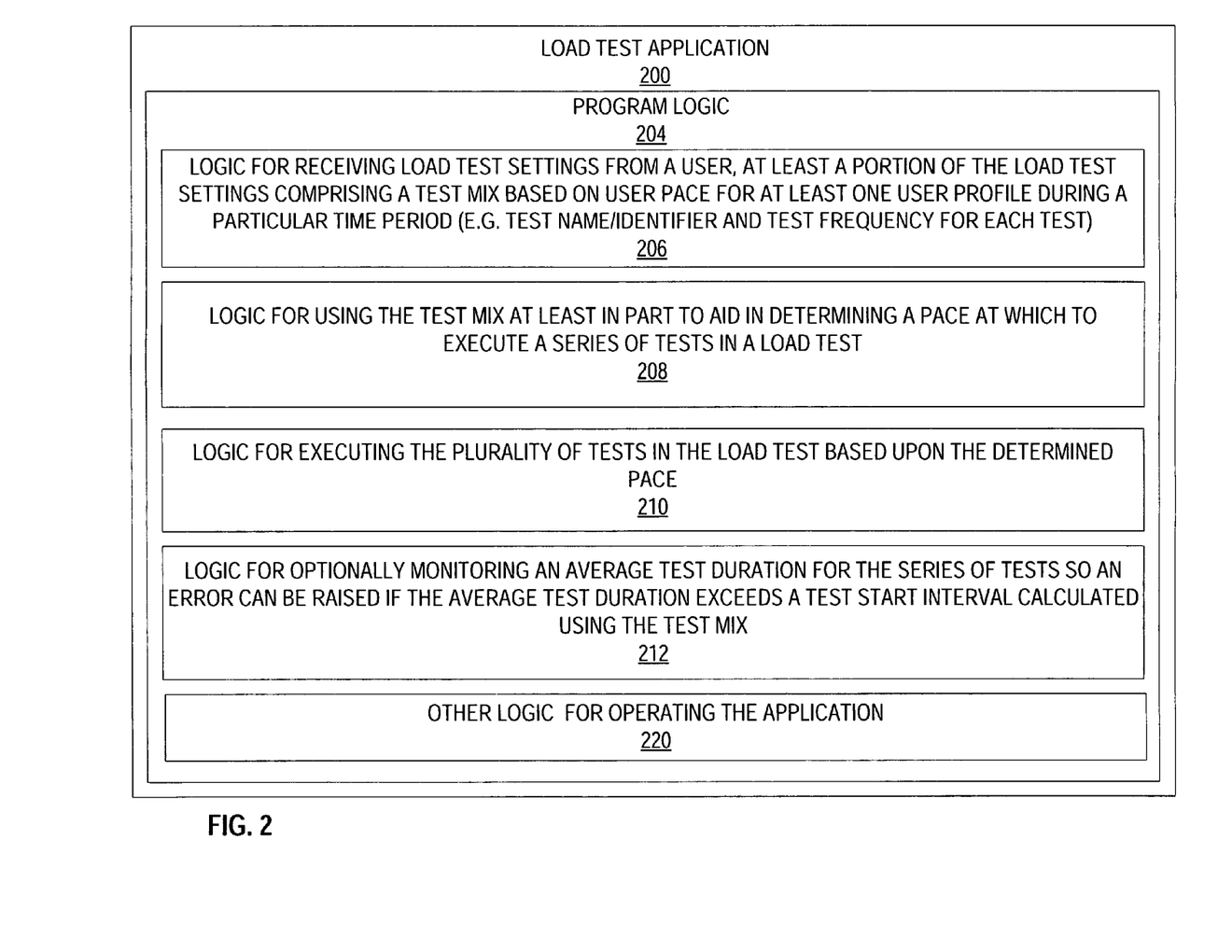
FIG. 2 is a diagrammatic view of a load test application of one implementation operating on the computer system of FIG. 1.

Turning now to FIG. 2 with continued reference to FIG. 1, a load test application 200 operating on computing device 100 is illustrated. Load test application 200 is one of the application programs that reside on computing device 100. However, it will be understood that load test application 200 can alternatively or additionally be embodied as computer-executable instructions on one or more computers and/or in different variations than shown on FIG. 1. Alternatively or additionally, one or more parts of load test application 200 can be part of system memory 104, on other computers and/or applications 115, or other such variations as would occur to one in the computer software art.

Load test application 200 includes program logic 204, which is responsible for carrying out some or all of the techniques described herein. Program logic 204 includes logic for receiving load test settings from a user, at least a portion of the load test settings comprising a test mix based on user pace for at least one user profile during a particular time period (e.g. test name/identifier and test frequency for each test) 206; logic for using the test mix at least in part to aid in determining a pace at which to execute a series of tests in a load test 208; logic for executing the plurality of tests in the load test based upon the determined pace 210; logic for optionally monitoring an average test duration for the series of tests so an error can be raised if the average test duration exceeds a test start interval calculated using the test mix 212; and other logic for operating the application 220. In one implementation, program logic 204 is operable to be called programmatically from another program, such as using a single call to a procedure in program logic 204.

Figure 3:
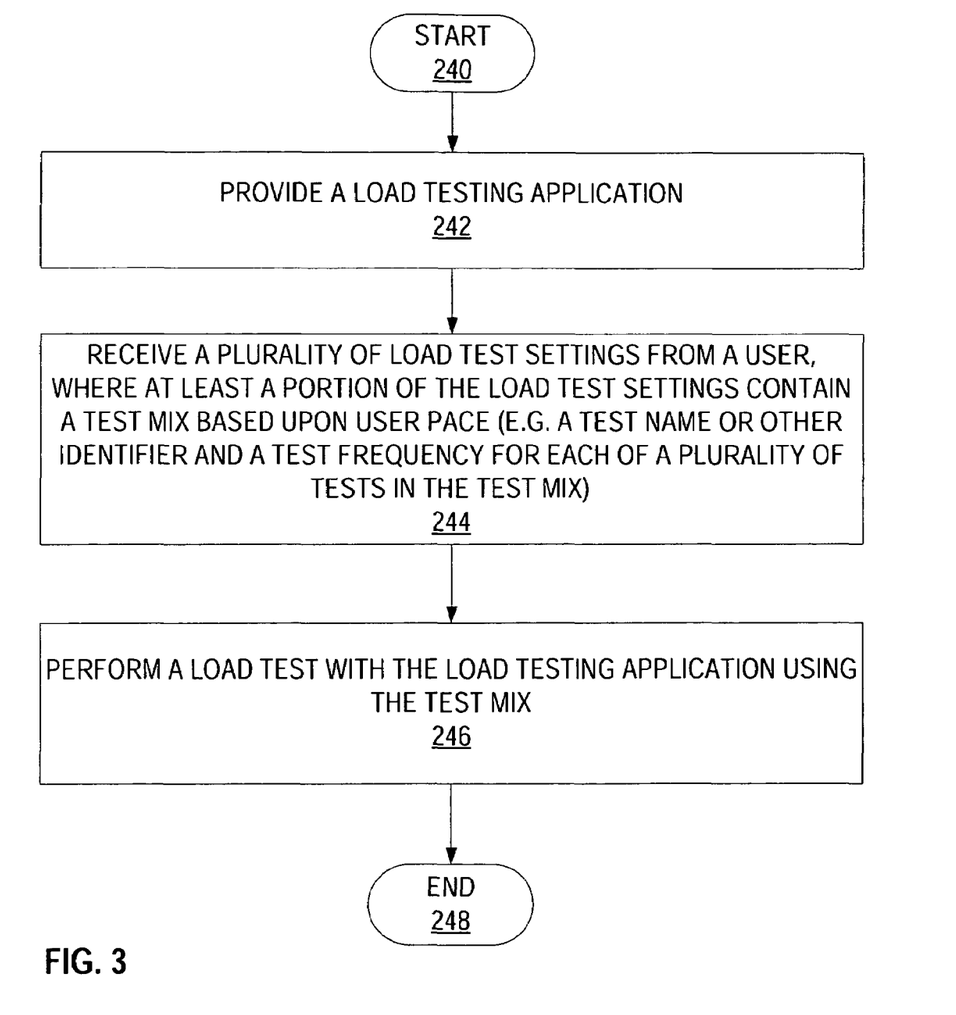
FIG. 3 is a high-level process flow diagram for one implementation of the system of FIG. 1.

Turning now to FIGS. 3-7 with continued reference to FIGS. 1-2, the stages for implementing one or more implementations of load test application 200 are described in further detail. FIG. 3 is a high level process flow diagram for load test application 200. In one form, the process of FIG. 3 is at least partially implemented in the operating logic of computing device 100. The procedure begins at start point 240 with providing a load testing application (stage 242). Load test settings are received from a user, where at least a portion of the load test settings contain a test mix based upon user pace (e.g. a test name or other identifier and a test frequency for each of a plurality of tests in the test mix) (stage 244). A load test is performed with the load testing application using the test mix (stage 246). The process ends at end point 248.

Figure 4:
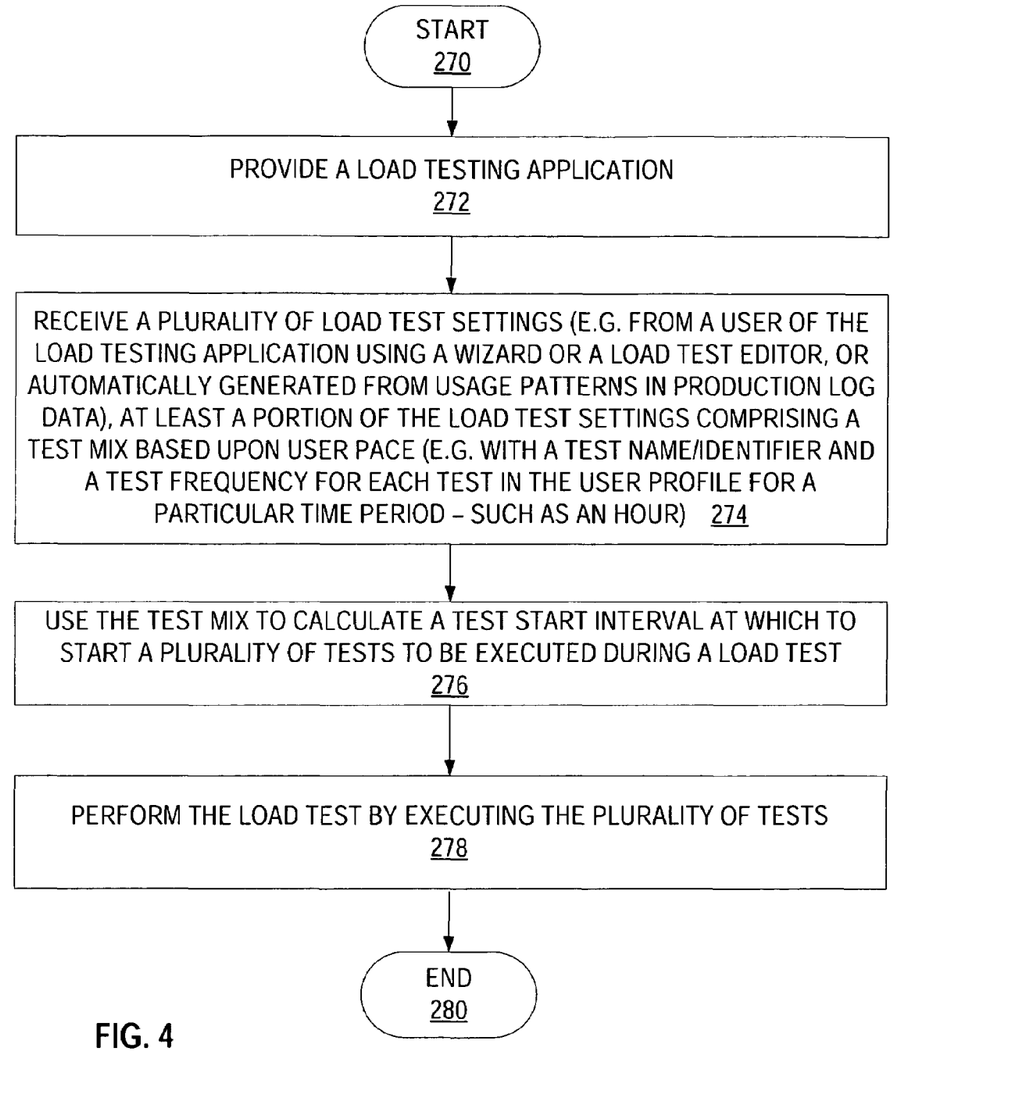
FIG. 4 is a process flow diagram for one implementation of the system of FIG. 1 illustrating the stages involved in receiving a test mix from a user for use in a load test.

FIG. 4 illustrates one implementation of the stages involved in receiving a test mix from a user for use in a load test. In one form, the process of FIG. 4 is at least partially implemented in the operating logic of computing device 100. The procedure begins at start point 270 with provide a load testing application (stage 272). Load test settings are received (e.g. from a user of the application using a wizard or a load test editor, or automatically generated from usage patterns in production log data), with at least a portion of the load test settings comprising a test mix based upon user pace (stage 274). In one implementation, a test name/identifier and a test frequency for each test in the user profile for a particular time period, such as an hour, are included in the test mix (stage 274). The test mix is used to calculate a test start interval at which to start a plurality of tests to be executed during a load test (stage 276). The load test is performed by executing the plurality of tests (stage 278). The process ends at end point 280.

Figure 5:
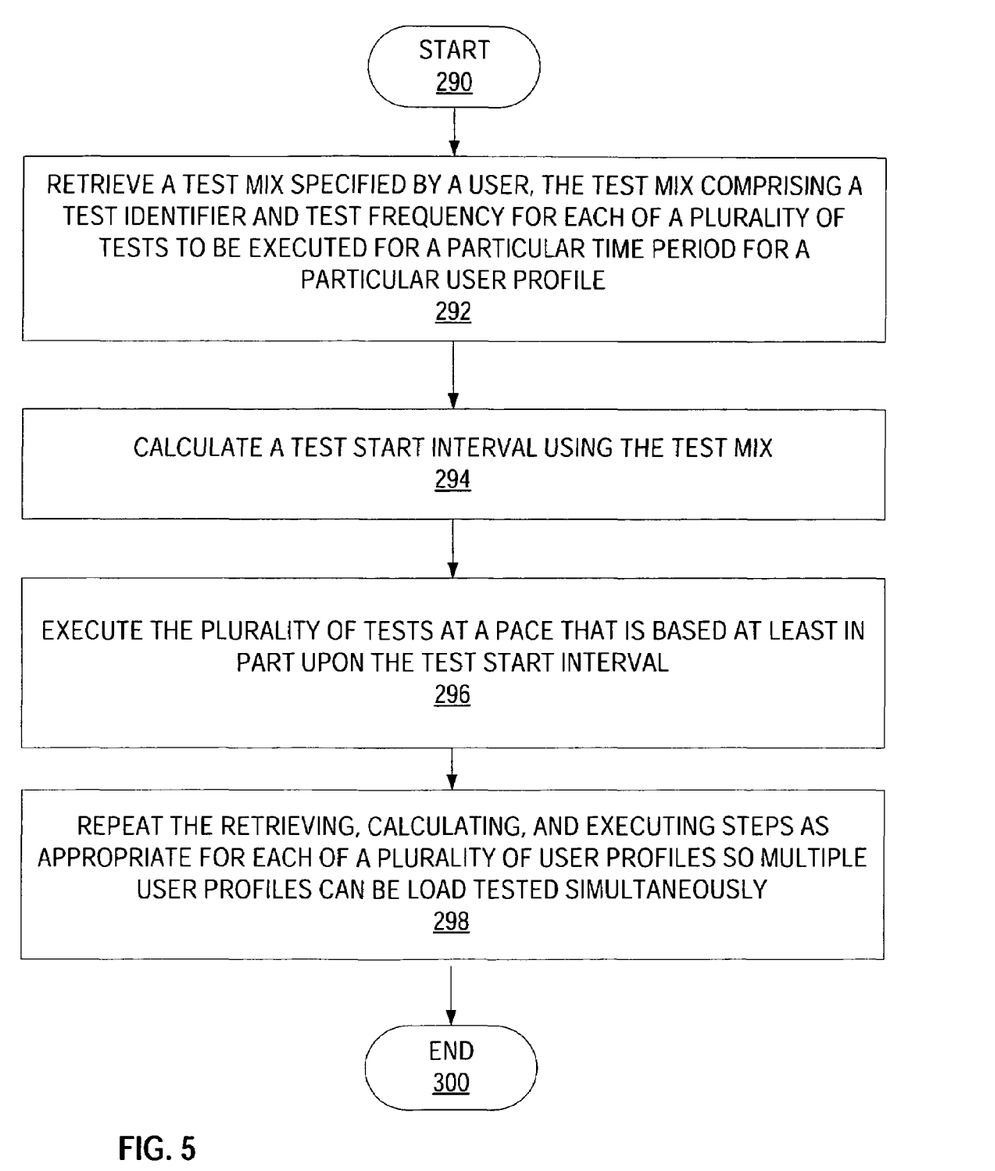
FIG. 5 is a process flow diagram for one implementation of the system of FIG. 1 illustrating the stages involved in executing a load test based upon a test mix specified by the user.

FIG. 5 illustrates one implementation of the stages involved in executing a load test based upon a test mix specified by the user. In one form, the process of FIG. 5 is at least partially implemented in the operating logic of computing device 100. The procedure begins at start point 290 with retrieving a test mix specified by a user, the test mix comprising a test identifier and test frequency for each of a plurality of tests to be executed for a particular time period for a particular user profile (stage 292). The system calculates a test start interval using the test mix (stage 294) and executes the tests at a pace that is based at least in part upon the test start interval (stage 296). The retrieving, calculating, and executing steps are repeated as appropriate for each user profile so multiple user profiles can be load tested simultaneously (stage 298). The process ends at end point 300.

Figure 6:
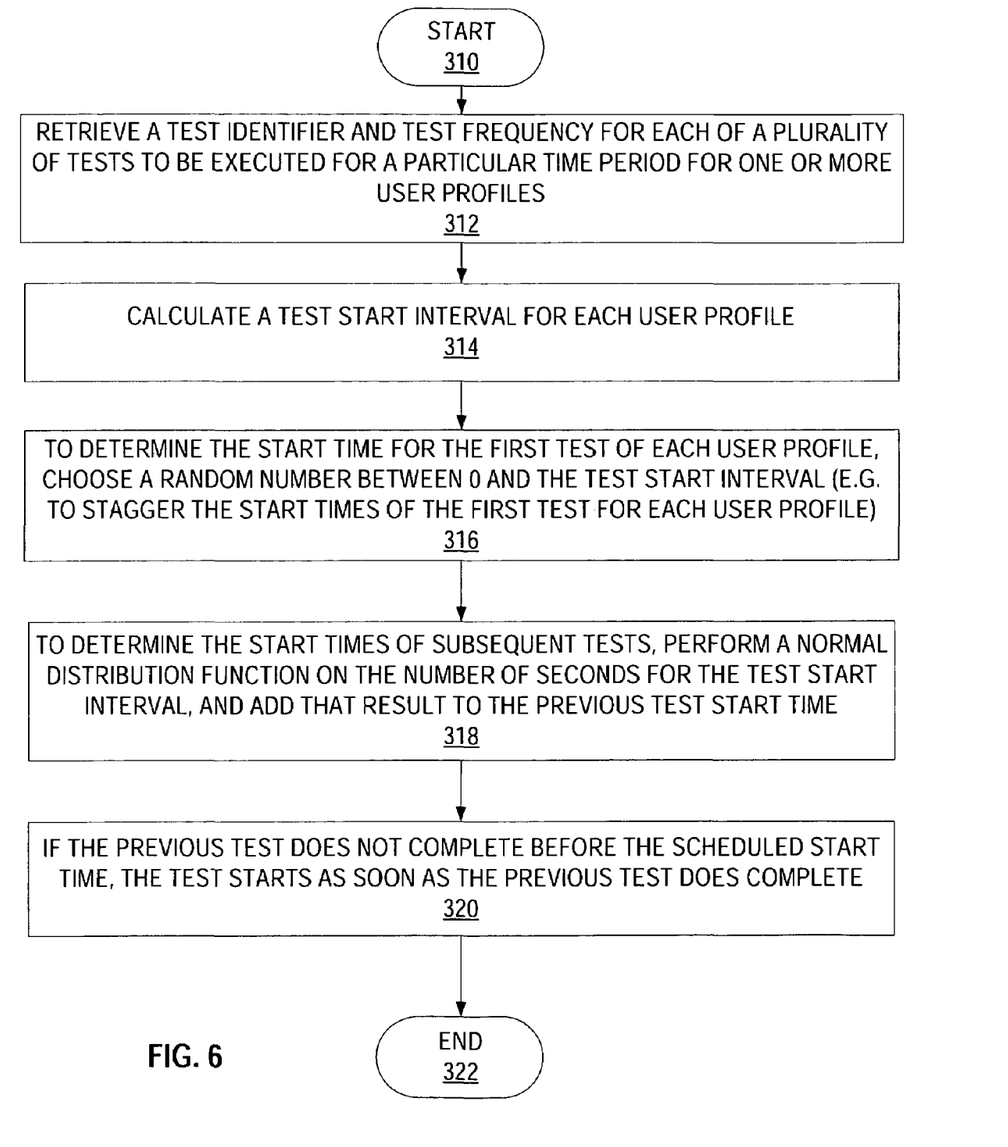
FIG. 6 is a process flow diagram for one implementation of the system of FIG. 1 illustrating the stages involved in calculating and using a test start interval to schedule the tests in the load test for each user profile.

FIG. 6 illustrates one implementation of the stages involved in calculating and using a test start interval to schedule the tests in the load test for each user profile. In one form, the process of FIG. 6 is at least partially implemented in the operating logic of computing device 100. The procedure begins at start point 310 with retrieving a test identifier and test frequency for each of a plurality of tests to be executed for a particular time period for one or more user profiles (stage 312). A test start interval is calculated for each user profile (stage 314). To determine the start time for the first test of each user profile, a number between 0 and the test start interval is chosen (e.g. randomly) to stagger the start times of the first test for each user profile (stage 316). To determine the start times of subsequent tests, a normal distribution function is performed on the number of seconds for the test start interval, and that result is added to the previous test start time (stage 318). if the previous test does not complete before the scheduled start time, the test starts as soon as the previous test does complete (stage 320). The process ends at end point 322.

Figure 7:
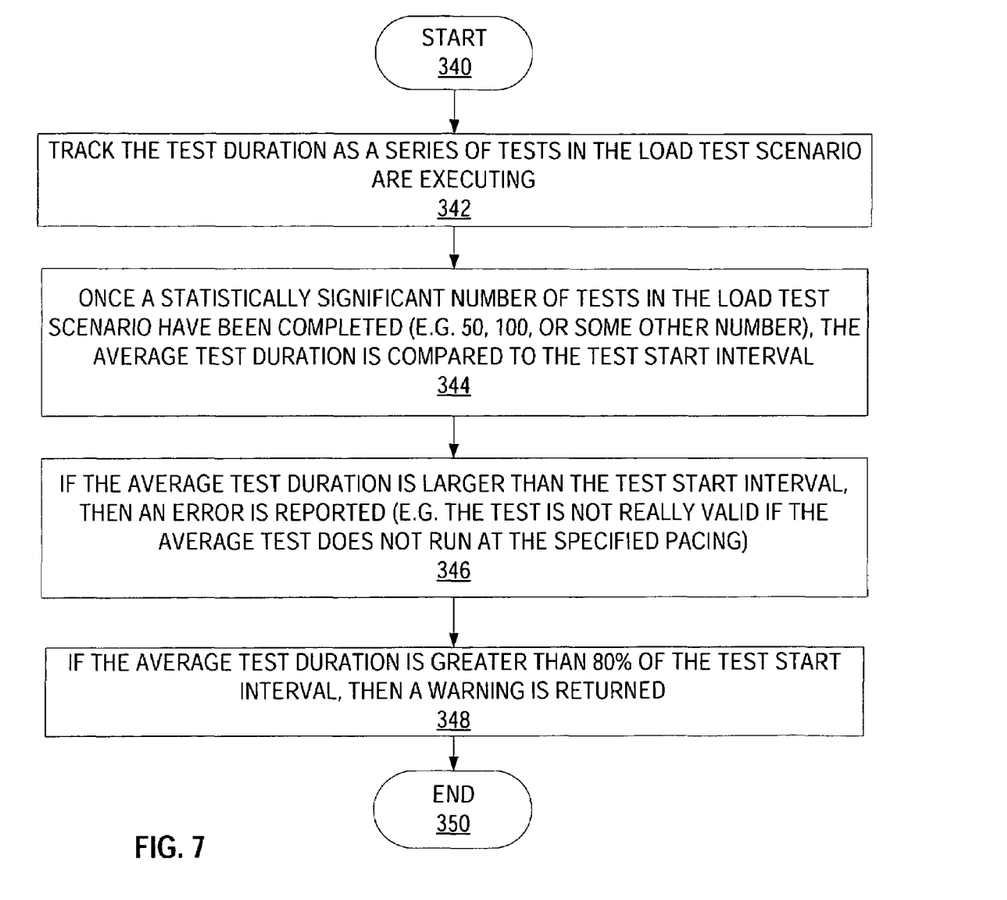
FIG. 7 is a process flow for one implementation of the system of FIG. 1 that illustrates the stages involved in monitoring an average test duration so an error can be raised if the average test duration exceeds the test start interval.

FIG. 7 illustrates one implementation of the stages involved in monitoring an average test duration so an error can be raised if the average test duration exceeds the test start interval. In one form, the process of FIG. 7 is at least partially implemented in the operating logic of computing device 100. The procedure begins at start point 340 with tracking the test duration as a series of tests in the load test scenario are executing (stage 342). Once a statistically significant number of tests in the load test scenario have been completed (e.g. 50, 100, or some other number), the average test duration is compared to the test start interval (stage 344). If the average test duration is larger than the test start interval, then an error is reported (stage 346). In one implementation, the test is not really valid if the average test does not run at the specified pacing (stage 346). In one implementation, if the average test duration is greater than 80% of the test start interval, then a warning is returned (stage 348). The process ends at end point 350.

Turning now to FIGS. 8-11, simulated screens are shown to illustrate an exemplary user interface of load test application 200 that allows a user to create and manage load tests using a test mix based on user pace as described herein. These screens can be displayed to users on output device(s) 111. Furthermore, these screens can receive input from users from input device(s) 112.

Figure 8:
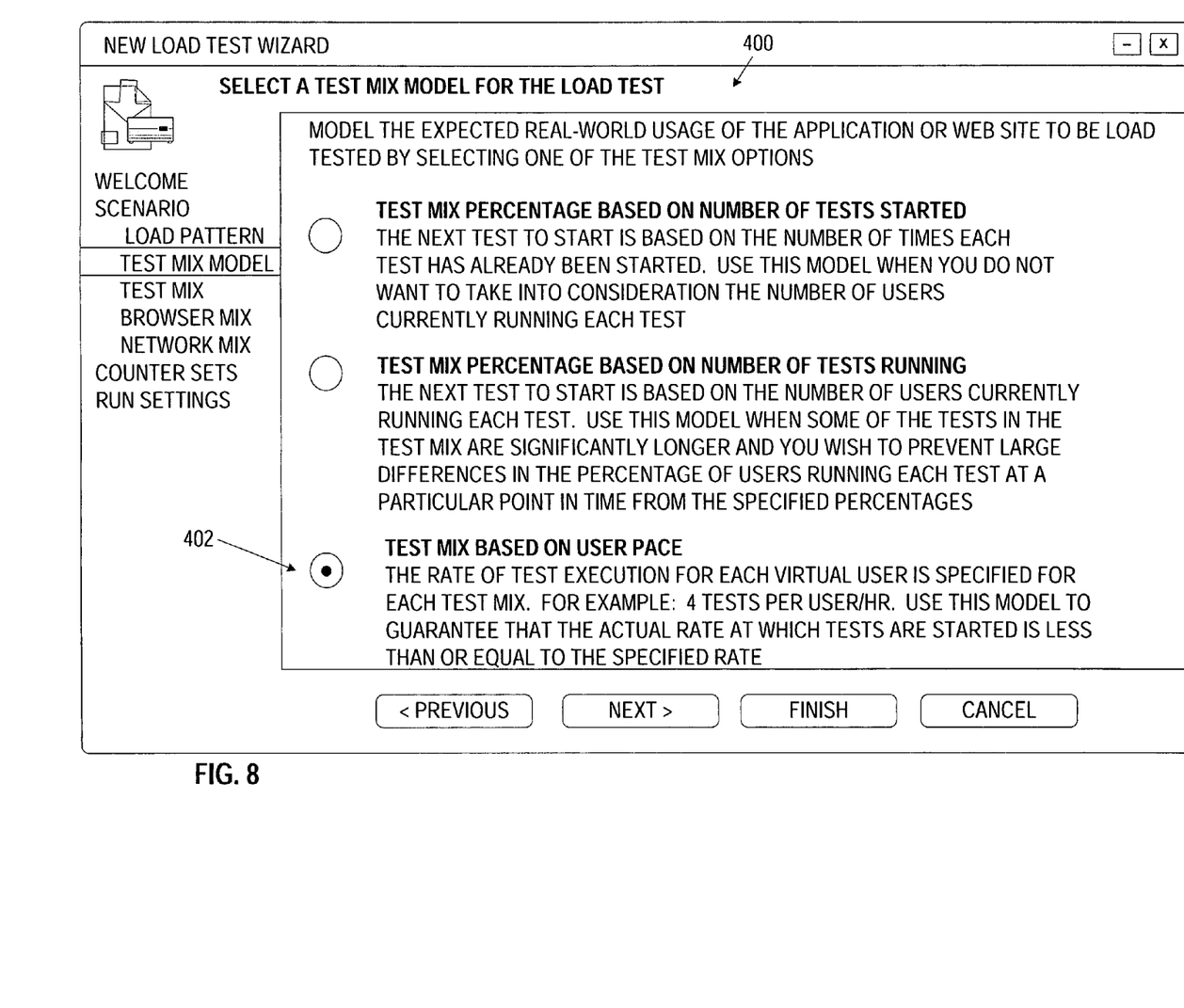
FIG. 8 is a simulated screen for one implementation of the system of FIG. 1 that illustrates a Load Test Wizard that allows a user to choose a test mix based on user pace.
Figure 9:
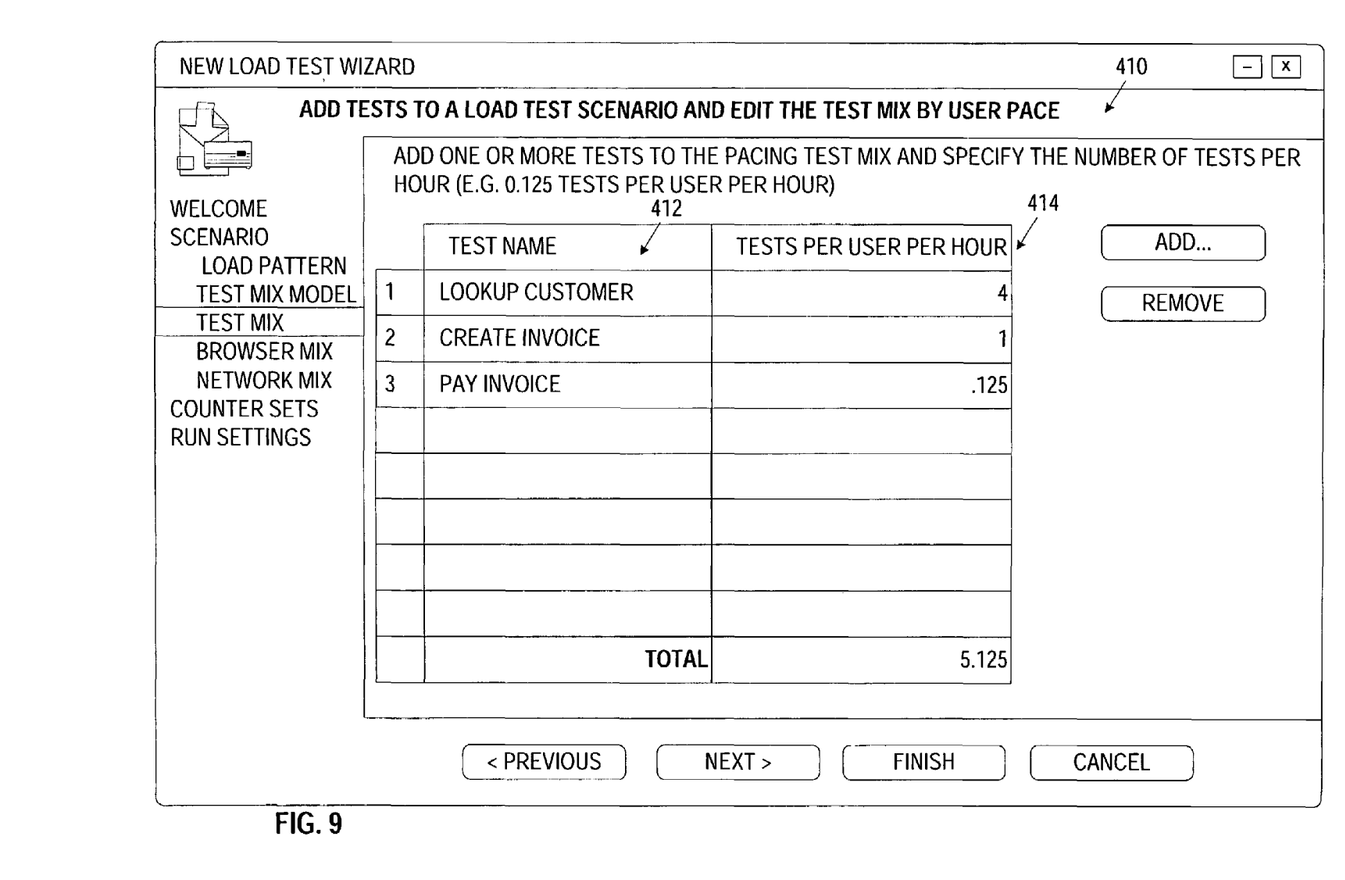
FIG. 9 is a simulated screen for one implementation of the system of FIG. 1 that illustrates editing a test mix for a particular user profile using a Wizard.

FIG. 8 is a simulated screen 400 for one implementation of the system of FIG. 1 that illustrates a Load Test Wizard that allows a user to choose a test mix based on user pace 402. Turning now to FIG. 9, a simulated screen 410 for one implementation is shown that illustrates editing a test mix for a particular user profile using the Load Test Wizard. The user specifies the test name 412 and test frequency 414 for each of the tests in the test mix. In the example shown, there are three tests: Lookup Customer, Create Invoice, and Pay Invoice. The Lookup Customer task is performed on average 4 times per hour by a particular user in the user profile, and thus it has been given a test frequency of 4. The Create Invoice tasks is performed an average of 1 time per hour, and thus has a test frequency of 1. The Pay Invoice task is performed an average of 0.125 times per hour, and thus has a test frequency of 0.125. These test frequencies in the test mix are used to specify the user pace at which the various tasks are performed. These values are then used to calculate the test start interval to set the pace at which to execute the load tests, as described in FIGS. 3-7.

Figure 10:
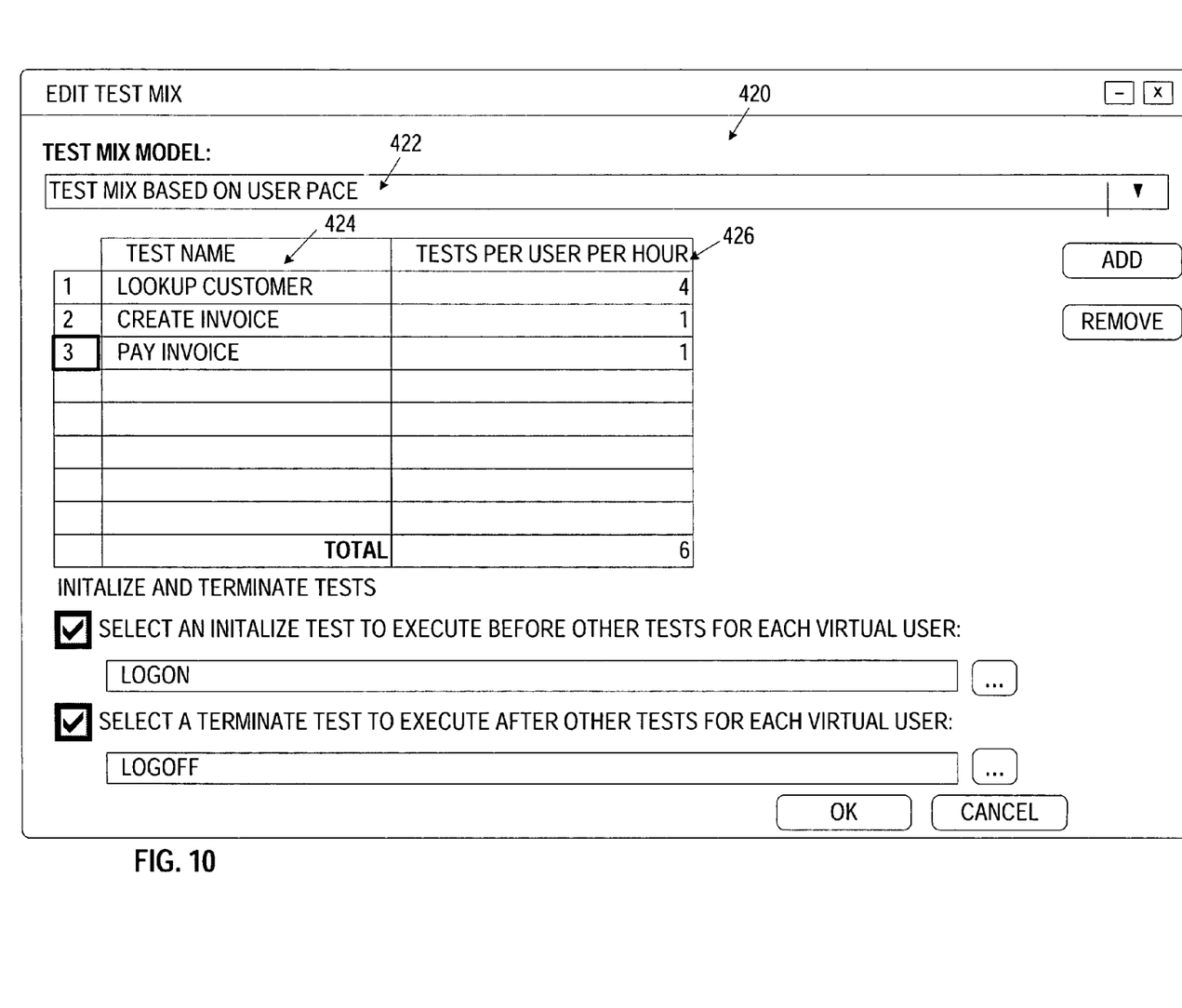
FIG. 10 is a simulated screen for one implementation of the system of FIG. 1 that illustrates modifying a test mix using a Test Mix Editor.

FIG. 10 is a simulated screen 420 for one implementation of the system of FIG. 1 that illustrates modifying a test mix using a Test Mix Editor. The user can edit the type of test mix being used by setting the Test Mix Model option 422. In this example, the Test Mix Model option 422 is set to "Test Mix Based on User Pace". For the "Test Mix Based on User Pace" test mix, the user can also set various other options, such as the Test name 424 and Test Frequency 426 for each test in the user profile.

Figure 11:
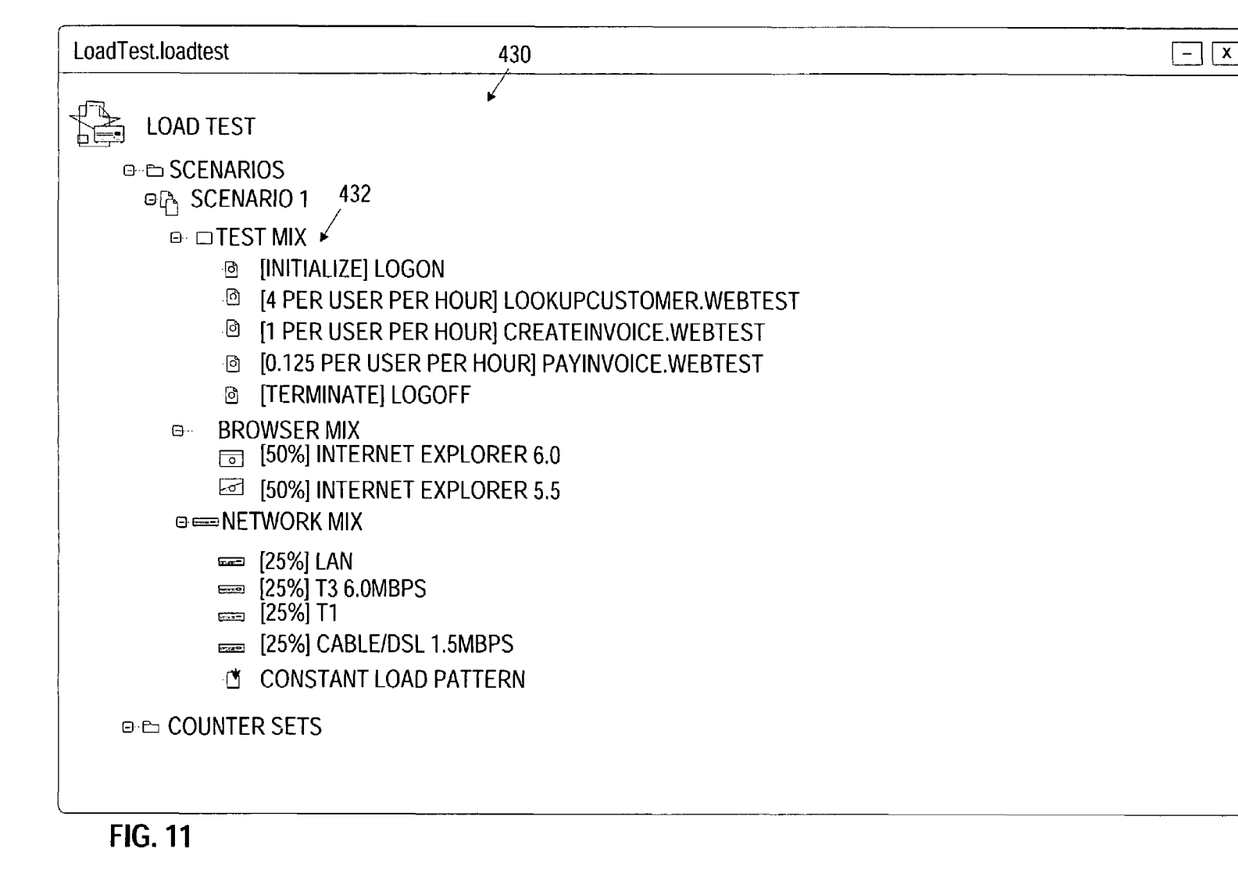
FIG. 11 is a simulated screen for one implementation of the system of FIG. 1 that illustrates a load test scenario that includes multiple tests for a particular user profile.

FIG. 11 is a simulated screen 430 for one implementation that illustrates a load test scenario that includes multiple tests for a particular user profile 432, as well as other details of the load test scenario.

Figure 12:
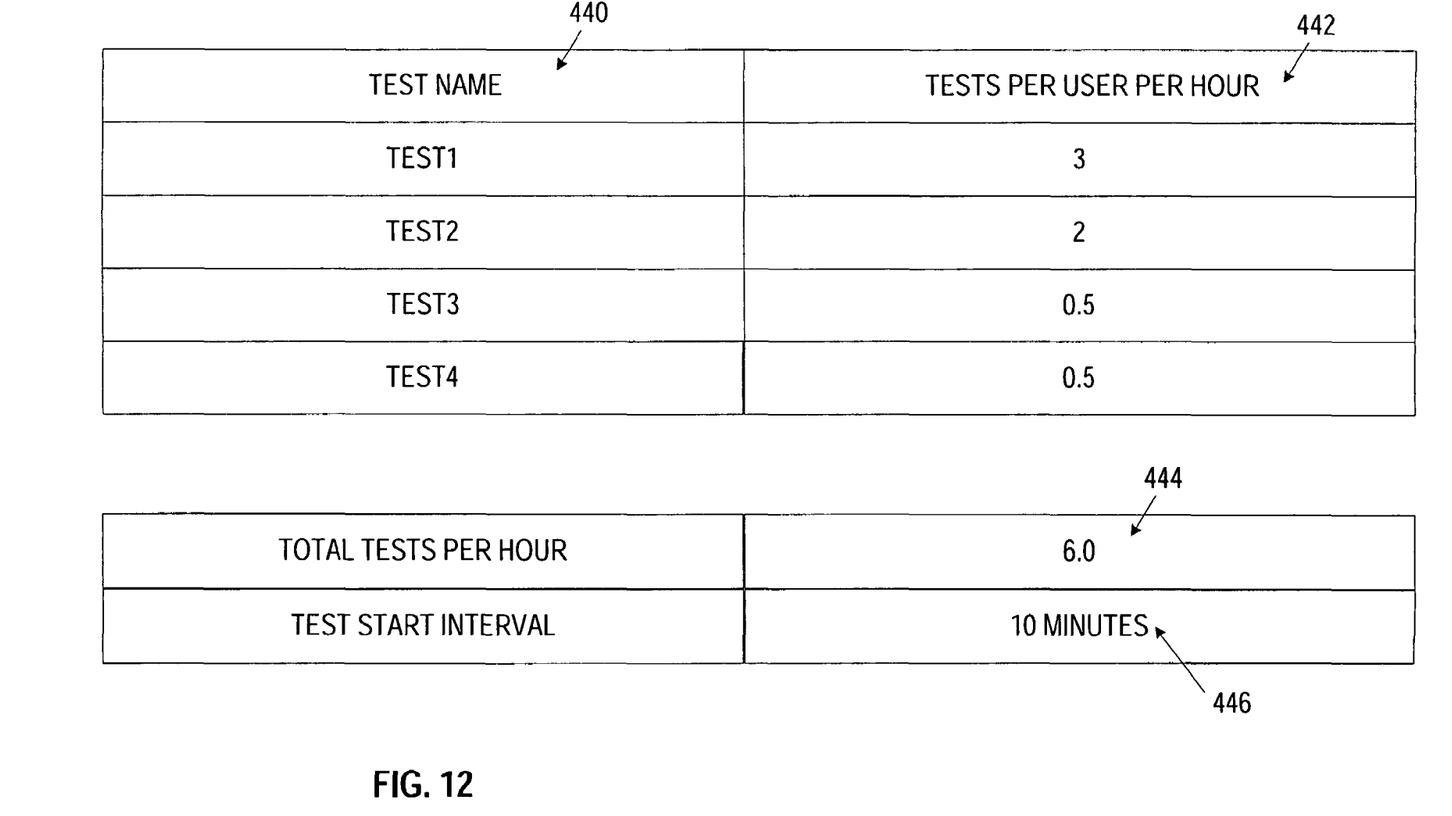
FIG. 12 is a diagram for one implementation of the system of FIG. 1 that illustrates an exemplary pacing test mix and a corresponding test start interval that has been calculated for the test mix.

FIG. 12 is a diagram for one implementation of the system of FIG. 1 that illustrates an exemplary pacing test mix and a corresponding test start interval that has been calculated for the test mix. The pacing test mix includes a test name 440 and a test frequency 442 for each test in the mix. A test start interval 446 is calculated by first summing the individual tests per hour 444. For the example shown, that is 3+2+0.5+0.5=6.0 (444). This result indicates how many tests per hour that user starts (on average). From this information, the system can then determine how many tests the user starts per hour (which is the test start interval). Then, to calculate the test start interval 446, the number of minutes in an hour is divided by the number of tests per hour (e.g. 60 minutes in an hour/number of tests the user starts per hour). In the example shown, 60 minutes divided by 6 tests per hour=10 minutes. This means that the user in the example described starts a new test every 10 minutes (446). This test start interval is then used by the system to determine the pace at which to begin new tests.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for performing a load test based upon user pace comprising the steps of:
    providing a load testing application;
    receiving a test mix matrix comprising a plurality of user profiles, a user profile corresponding to a type of user expected to use a system to be tested, each user profile comprising a different set of associated transactions to be performed by the system to be tested, where the transactions each have an associated respective user pace, the user paces comprising pre-determined frequencies of the respective transactions;
    computing test start time intervals for the user profiles of the test mix matrix, respectively, the test start time interval of a user profile being based on total frequency of the pre-determined frequencies of the load test settings of the transactions in the user profile; and
    performing a load test with the load testing application using the text mix, where the user profiles of the test mix matrix are executed in parallel, and where the transactions of a user profile are initiated for execution at a pace that is based on the test start time interval of the user profile, the transactions of the user interval starting at intervals based on the test start time interval of the user profile, whereby transactions of a user profile execute at time intervals based on the total transaction frequency of the user profile.

2. The method of claim 1, wherein the test mix is received from a user of the load testing application.

3. A computer-readable medium having computer-executable instructions for causing a computer to perform the steps recited in claim 1.

4. A method for scheduling load tests using a pacing test mix comprising the steps of:
    retrieving a test mix specified by a user of a load testing application, the test mix comprising a plurality of user profiles, each user profile comprising a plurality of transactions to be executed, each transaction having a respective pre-defined rate of execution;
    calculating a test start interval for each user profile of the text mix, a test start interval of a user profile comprising a time interval for executing the transactions of the user profile such that the transactions of the user profile are executed at intervals of time according to the time interval, the test start interval of a user profile being computed in accordance with an overall rate of execution of the user profile's transactions according to the pre-defined rates of execution of the transactions;

executing transactions of the plurality of the user profiles in parallel, where the transactions of a user profile are executed at succeeding intervals of time based on the test start interval of the corresponding user profile; and computing an average time to complete the executed transactions of a user profile and comparing the average to the time interval of the corresponding user profile.

5. The method of claim 4, wherein a start time for a first transaction for each of the plurality of user profiles is determined by choosing a random number between zero and the test start interval.

6. The method of claim 5, wherein subsequent tests for each of the plurality of user profiles are started based on the test start intervals of the respective user profiles.

7. The method of claim 4, wherein average execution durations for the transactions in each of the respective plurality of user profiles is monitored determine if the a user profile's average execution duration exceeds the corresponding test start interval.

8. The method of claim 4, wherein an average transaction duration for a user profile is compared with the test start interval for the corresponding user profile.

9. A computer-readable medium having computer-executable instructions for causing a computer to perform the steps recited in claim 4.

10. A method according to claim 1, wherein when a transaction of a user profile starts at a first point in time and finishes executing at a second point in time and the time between the first and second points in time is less time than the test start interval for the user profile, then a next transaction's execution start time is based on a third point in time comprising the first point in time plus an amount of time based on the test start interval.

11. A method according to claim 10, wherein when a transaction of the user profile starts at a fourth point in time and ends at a fifth point in time and the time between the fourth and fifth points in time is greater than the test start interval, then a next transaction starts at the fifth point in time.

12. A method according to claim 10, wherein the amount of time comprises the test start interval adjusted by a random amount of time.

13. A method according to claim 1, wherein a first transaction of a user profile starts at a first point in time, and a second succeeding transaction of the user profile has a start time based on adding the test start interval to the first point in time and adding or subtracting a random amount of time that is chosen to be less than the test start interval.

* * * * *